June 24, 1941.    G. P. TORRENCE    2,246,553
APPARATUS FOR PROCESSING THREAD
Filed Oct. 24, 1938    7 Sheets-Sheet 1

Fig. 1

Inventor
GEORGE P. TORRENCE
By Charles D. Herrstrom
Attorney

FIG. 2

Inventor
GEORGE P. TORRENCE

June 24, 1941.   G. P. TORRENCE   2,246,553
APPARATUS FOR PROCESSING THREAD
Filed Oct. 24, 1938   7 Sheets-Sheet 3

Inventor
GEORGE P. TORRENCE
By Charles P. Herrstrom
Attorney

June 24, 1941.  G. P. TORRENCE  2,246,553
APPARATUS FOR PROCESSING THREAD
Filed Oct. 24, 1938  7 Sheets-Sheet 4

FIG. 5

Inventor
GEORGE P. TORRENCE
BY
Attorney

June 24, 1941.  G. P. TORRENCE  2,246,553
APPARATUS FOR PROCESSING THREAD
Filed Oct. 24, 1938  7 Sheets-Sheet 7

FIG. 14

Inventor
GEORGE P. TORRENCE
BY Charles E. Herrstrom
Attorney

Patented June 24, 1941

2,246,553

UNITED STATES PATENT OFFICE 2,246,553

APPARATUS FOR PROCESSING THREAD

George P. Torrence, Shaker Heights, Ohio, assignor to Industrial Rayon Corporation, Cleveland, Ohio, a corporation of Delaware Application October 24, 1938, Serial No. 236,724

11 Claims. (Cl. 18—8)

This invention relates to apparatus for the processing of thread or the like, hereinafter referred to as "thread"; more particularly, to apparatus for the continuous processing of multiple filament artificial silk thread.

In the manufacture, for example, of multiple filament viscose artificial silk thread it is necessary to make economical use of the various treating liquids employed in the processing of the thread, this because of the large quantities which must be employed and the comparatively high cost of the treating liquids. Even the cost of the water used in the manufacture of multiple filament viscose artificial silk thread is an important factor, not only because of the large quantities used for the several washing treatments but because it is often necessary to treat the water in order to obtain the requisite purity and softness. Indeed, the cost of the water may in large measure determine the commercial success or failure of a given plant.

In the ordinary discontinuous systems of manufacturing multiple filament viscose artificial silk thread; i. e., the pot-spinning and spool-spinning systems, the thread is subjected to the action of the processing liquids while it is wound in the original spin cake or spool package. That is, the thread is treated with liquids while wound in a compact package containing thousands of yards of thread wound layer upon layer. Of a given amount of liquid applied to the thread package, most if not all serves to process the thread; but it is known that, due to difficulties of penetration of the processing liquid, all portions of thread in the package are not uniformly processed.

In the continuous processing of multiple filament viscose artificial silk thread, on the other hand, the thread is continuously but temporarily stored on one or more thread-advancing thread storage devices, being subjected to the action of processing liquids while wound in a helix made up of a large number of closely spaced turns.

As compared with discontinuous systems, the advantages of manufacturing multiple filament viscose artificial silk thread by a system involving the continuous processing of the thread are so great as to have served in the past as an incentive for numerous attempts to devise a successful continuous processing system. It has long been recognized that a continuous system of manufacturing multiple filament viscose artificial silk thread would possess advantages over discontinuous systems in making possible savings in time and labor, this for the reason that the numerous processing treatments which must be applied to the thread may be performed continuously on a single machine. A continuous manufacturing system would possess great advantages as regards thoroughness and uniformity of processing because the thread is subjected to the processing treatment while wound in a single layer and is not processed, as in the discontinuous processes, while wound in package form.

It has, however, been found that systems involving the continuous processing of the thread are often less economical in their use of processing liquids than discontinuous systems. This arises in part from the fact that in continuous systems the thread is processed while wound in a single layer. All of the liquid applied to the thread is not used in the actual processing of the thread; instead, part of the liquid runs off the thread-advancing thread storage device and part passes between the turns of thread. Other disadvantages have been found to arise from the fact that in some cases intermixing of the processing liquids tends to occur.

The apparatus of the present invention eliminates difficulties arising out of the tendency of continuous processing systems to use more processing liquids to process a given amount of thread than discontinuous systems. It provides an economy of consumption of processing liquids comparing very favorably with that of the discontinuous systems; indeed, in some respects the present invention makes possible greater economies in respect of the use of processing liquids than the ordinary discontinuous system. Among other things, the apparatus of the present invention provides for the recovery and re-use of processing liquids of such nature that they can be re-used. If desired, it may also provide for the re-use of processing liquids, such as washing water, in several different processing steps, in this way providing great economies in consumption. Intermingling of the various processing liquids is prevented, so that the possibility of contamination of the treating liquids is obviated.

For purposes of illustration, the present invention is described herein in connection with the manufacture by a continuous system of multiple filament viscose artificial silk thread on apparatus generally similar to that shown, described and claimed in copending application Serial No. 7,114, filed February 13, 1935, by Walter F. Knebusch and Alden H. Burkholder (Patent 2,225,642). It should, however, be understood that the present invention is not limited thereto, but may be employed in the processing of thread produced by other methods, as, for example, from casein, cellulose acetate, cuprammonium cellulose solutions, etc. As already indicated, the apparatus of the present invention is applicable not only to the processing of multiple filament artificial silk thread, but to the processing of thread-like articles generally.

In the drawings, in which is shown a preferred form of the improved apparatus for the manufacture of multiple filament viscose artificial silk thread.

In the illustrated embodiment of the invention, two thread-processing machines generally of the type disclosed in application Serial No. 7,114 are located in end-to-end relation, being separated by a space in which are disposed the several supply and discharge elements for carrying the liquids necessary to process the thread. The supply and discharge elements, located in the space between the two machines, handle the processing liquids delivered to and drained from the thread-advancing reels of each machine. Each of the machines is preferably double-sided; that is, each side of the machine not only provides means for forming the threads but includes the thread-advancing reels upon which such threads are processed.

Upon each side of each machine as many as fifty or more threads 11 may be processed, each on its own descending series of thread-advancing reels 1 to 10, inclusive.

Each of the threads 11 is formed by extrusion of viscose through a spinneret 12 disposed in a coagulating bath contained in trough 13. The trough 13 preferably extends throughout the entire length of each machine, having located in it the spinnerettes 12 which form the threads 11 for both sides of the machine. The mass tubes 14 which supply the viscose employed in forming the threads to be processed on a given side of a machine are all mounted on and accessible from the side of the coagulating trough 13 on the side of the machine to which the threads pass. Thus a single coagulating trough, accessible from both sides, contains the spinnerettes which form the threads processed on opposite sides of the machine.

Figure 2:
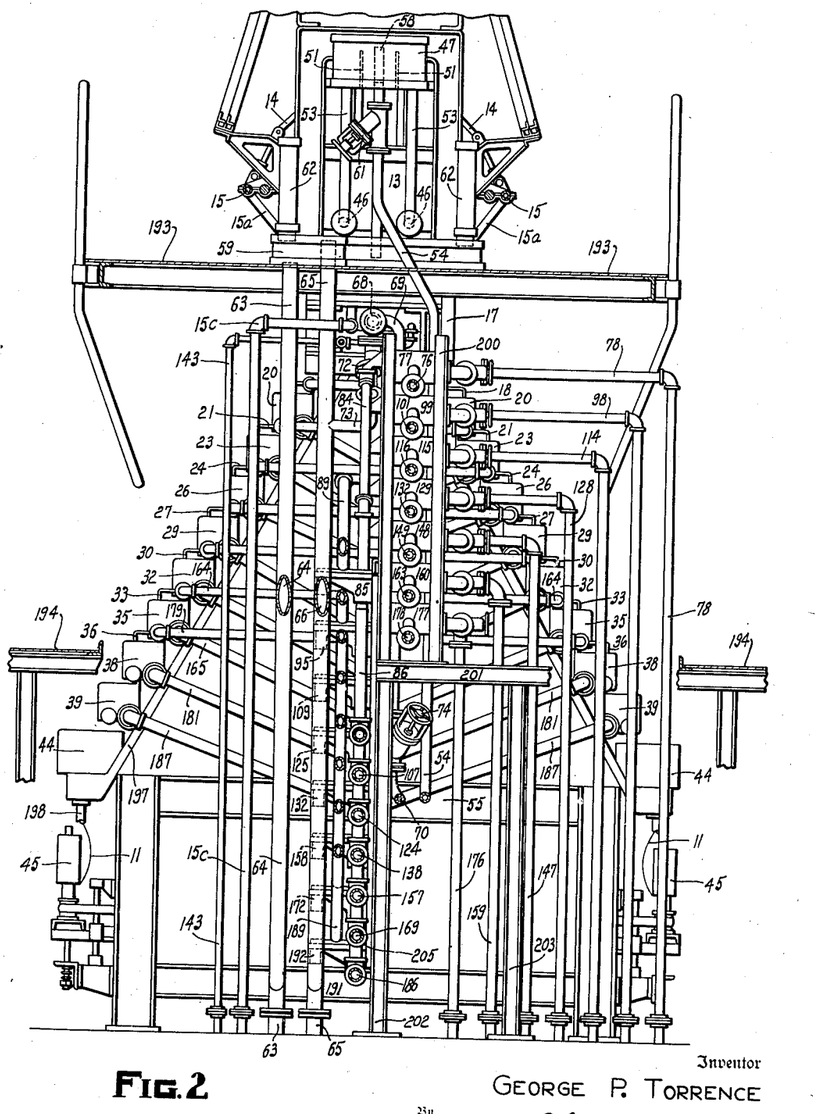
Figure 2 is a transverse sectional elevation on line 2—2 of Figure 5, showing an end elevation of the same machine.
Figure 5:
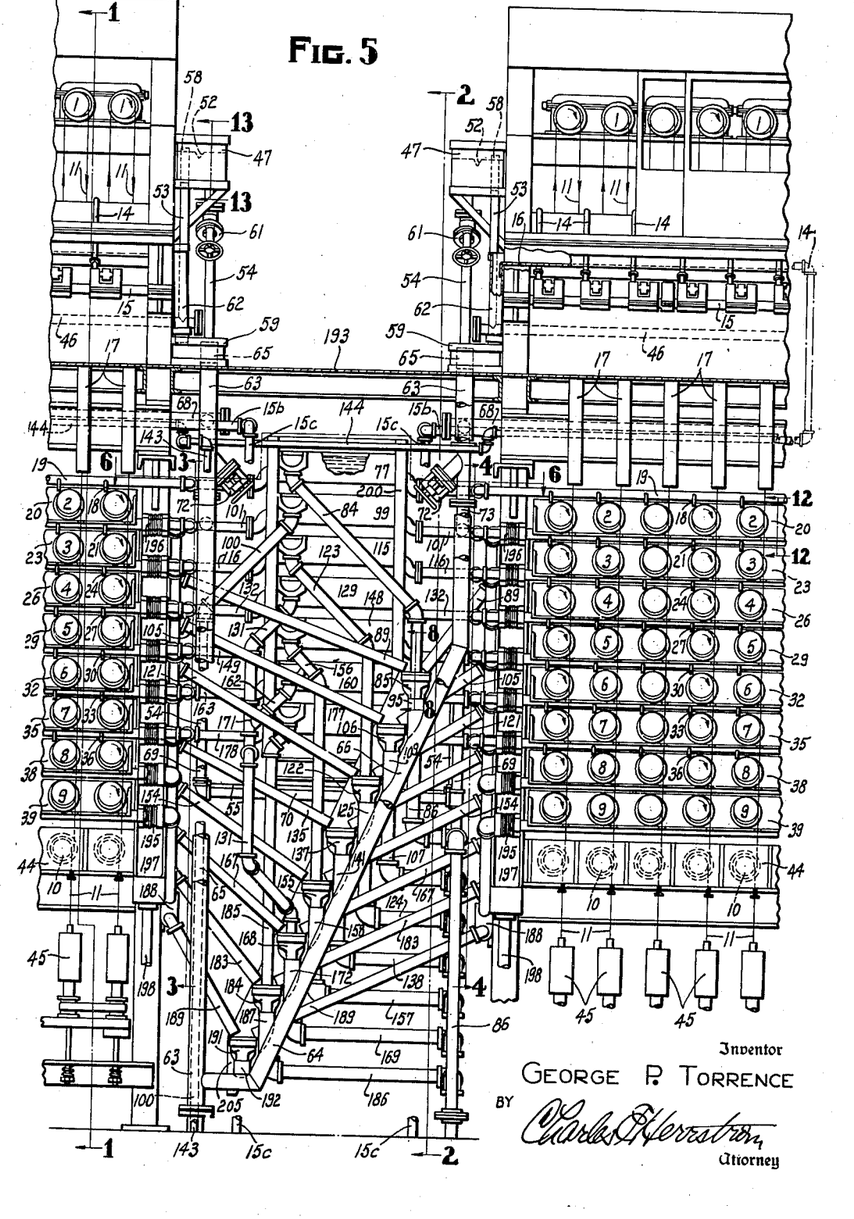
Figure 5 is a side elevation showing portions of two adjacent machines, each of the type shown in Figure 1, with common processing liquid-conveying means disposed therebetween, parts being broken away for the sake of clearness.

The mass tubes 14 on each side of the coagulating trough receive the viscose through a conduit 15 on each side of the machine and extend lengthwise thereof. The viscose is supplied to the side conduits 15 on each machine through pipes 15a from a conduit 15b which extends longitudinally of the machine, as shown in Figure 5. The conduit 15b for each machine is supplied from a pipe 15c disposed between the machines, as shown in Figures 2 and 5. The pipe 15c for each machine passes through the floor and communicates with the viscose supply tank, not shown, in the basement.

A waste trough 16 extends lengthwise of the trough 13 along each longitudinal edge thereof, such waste trough being disposed between the trough and the trough apron. The primary purpose of each of the waste troughs 16 is to receive any viscose which may be discharged from the mass tubes 14 after they have been swung out of the trough 13 to the retracted position indicated by the dotted lines 14', as for cleaning or replacement of spinnerettes, etc. A stream of liquid; e. g., water, is passed continuously through each of waste troughs 16 to carry away such discharged viscose or other waste matter.

The thread passes from each of the spinnerettes 12 to a corresponding thread-advancing reel 1 disposed above the trough 13, such reel being similar in construction and mode of operation to each of reels 2 to 10, inclusive.

As explained in application Serial No. 7,114, each of the reels 1 to 10, inclusive, comprises two rigid, rotatable sets of interdigitating bar members, the axes of said sets being located in offset and inclined relation to each other. As the reel rotates, the thread passing to the reel winds on the reel and is advanced longitudinally thereof in a plurality of closely spaced substantially helical turns. In the illustrated apparatus, as in the apparatus of said prior application, the reel is of cantilever form in that it is supported from one end only. It advances the thread from its supported end to its unsupported end, so that the thread may be readily removed from the unsupported end of the reel.

In the illustrated apparatus, each reel 1 is disposed above the trough 13 with its supported end over the trough in such manner that the path of the thread in passing from the spinnerette to the reel is entirely within the confines of the trough. The unsupported end of the reel is located beyond the edge of the trough so that the thread may pass vertically downward, outside the trough, to the succeeding reel. In the embodiment illustrated, a channel 17 the upper end of which is located directly beneath the discharge point of the reel 1 is disposed at the edge of the trough 13 to provide a passage for the thread from the reel 1 to the succeeding reel 2.

Inasmuch as no processing liquid is applied to the thread on the reel 1, the latter serves to provide an additional period of time for coagulation of the thread.

Reels 2 to 10, inclusive, of each descending series are disposed in stepped arrangement with the unsupported ends of all reels extending in the same direction and with the supported end of each reel in apposite relation to the unsupported end of its predecessor. The unsupported ends of all reels are thus presented to the operator. This arrangement of reels is disclosed in application Serial No. 7,114, in which are described the many advantages made possible by such an arrangement.

Upon reel 2 the thread may be subjected to the action of a liquid intended to further the coagulation of the thread. In the illustrated embodiment of the invention, this solution is applied to the thread on the reel 2 from a distributor 18 which communicates with a conduit 19 extending lengthwise of the machine. The reels 2 in all series on the same side of the machine, as well as all corresponding reels on the opposite side of the machine, are disposed in corresponding positions, whereby the construction of reagent supply and collecting systems is greatly simplified. Thus the desired reagent may be supplied to all of the reels on one side of the machine from a common conduit 19 with which the distributors 18 communicate; while the same reagent, after use, may be collected from a plurality of said reels by the collecting trough 20 extending below the reels 2. The collecting trough 20 conveys the liquid to one end of the machine, from which the liquid may be removed. In the illustrated embodiment of the invention, the used liquid in all troughs is collected at the end of the machine from which the processing liquid is initially supplied.

Figure 12:
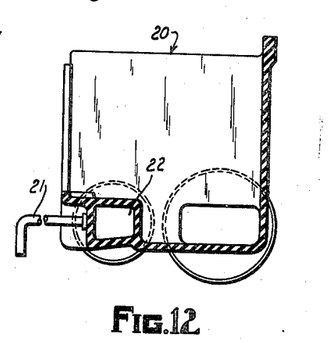
Figure 12 is a section through one of the collecting troughs corresponding to line 12—12 of Figure 5.

Reel 3, to which the thread next passes, serves to store the thread while it is subjected to the succeeding treatment, which may be the application of a washing liquid, preferably a weak acid solution, through a distributor 21 connected to longitudinally extending conduit 22. The conduit 22 is disposed in the illustrated embodiment of the invention at the forward portion of and is formed integrally with the collecting trough 20 underlying the preceding reels 2, as shown in Figure 12. The liquid leaving the reels 3 is collected in a trough 23 disposed below the reels.

Reel 4, to which the thread passes from reel 3, stores the thread while it is subjected to the action of a desulphurizing liquid, such as sodium sulphide, employed for the purpose of removing the sulphur deposited in and upon the thread as part of the coagulation and regeneration reactions. The sodium sulphide solution is showered upon each reel 4 by a distributor 24 which receives the fluid from the longitudinally extending conduit 25 forming a part of the collecting trough 23 below the preceding reel 3. The liquid is collected in a trough 26 beneath reel 4, from the unsupported end of which the thread passes to reel 5. Upon the latter, the thread is washed with water delivered from distributor 27 connected to longitudinal conduit 28 forming an integral part of the collecting trough 26 beneath reels 4. A collecting trough 29 is provided to collect the liquid leaving the reels 5.

Upon reel 6, to which the thread next passes, bleaching solution is applied to the thread by means of a distributor 30 connected to a longitudinal conduit 31 forming part of the trough 29 below reels 5. A collecting trough 32 is provided below reels 6. The thread is washed free of the bleaching solution as it passes over reel 7, washing water being delivered to the reel through distributor 33 which is supplied with water by means of a longitudinal conduit 34 carried by the collecting trough 32 disposed below the reels 6.

Collecting trough 35 is disposed below the reels 7.

A soaping or oiling emulsion employed for the purpose of improving the characteristics of the thread, such as its "feel" or "hand," is applied to the thread while it is stored upon reel 8. The finishing liquid thus applied to the thread is supplied through distributor 36 which communicates with a conduit 37 forming part of the trough 35. A trough 38 is disposed below the reels 8 to collect the liquid used in the finishing operation. Upon reel 9, to which the thread proceeds from reel 8, no processing liquid is applied to the thread from the conduit 40; instead, the reels 9 serve as a drip stage to permit the excess finishing liquid to drip from the thread before it passes to the drying device. Trough 39 is provided below the reels 9 to catch and remove the liquid which drips from reels 9.

Figure 1:
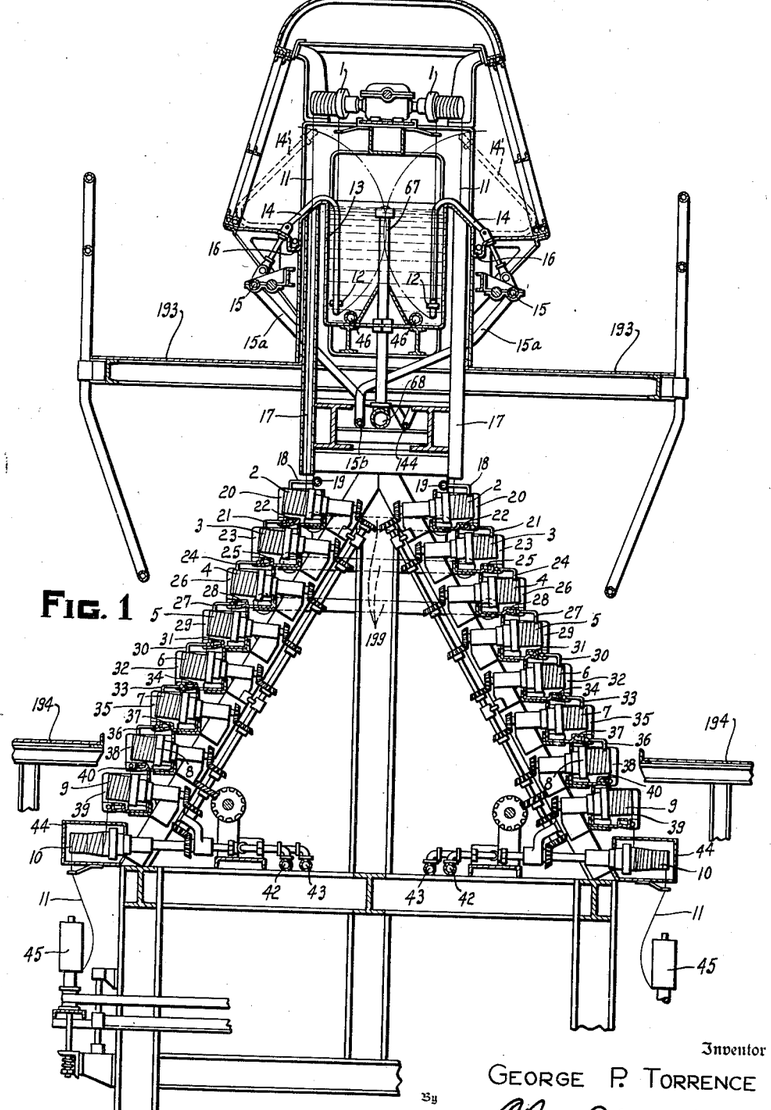
Figure 1 is a transverse sectional elevation on line 1—1 of Figure 5 of one of two machines for the manufacture of such artificial silk thread by a continuous system.

In the illustrated embodiment of the invention, each thread 11 is dried on a heated reel 10. The reel 10 is preferably formed with an interior chamber (not shown) through which hot water or some other suitable medium is circulated by means of supply pipe 42 and return pipe 43 (Figure 1). These pipes communicate with suitable recirculating means (not shown) including heating facilities and such, if any, make-up tanks as may be necessary. Each reel 10 is preferably at least partially enclosed in a casing 44 which aids in maintaining constant drying conditions.

After leaving drying reels 10 the threads 11 may be collected by any suitable means; for example, cap twisters 45 which may be rotated and reciprocated vertically in the conventional manner.

Figure 13:
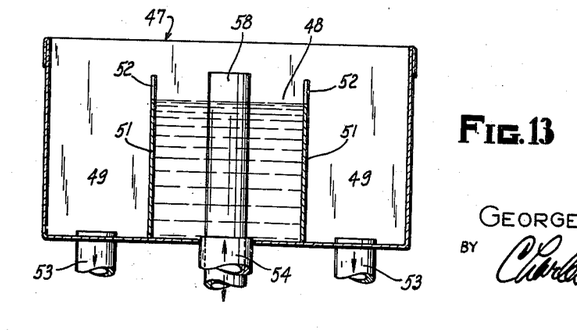
Figure 13 is a sectional elevation of the coagulating liquid supply box for one of the machines, corresponding generally to line 13—13 of Figure 1.
Figure 14:
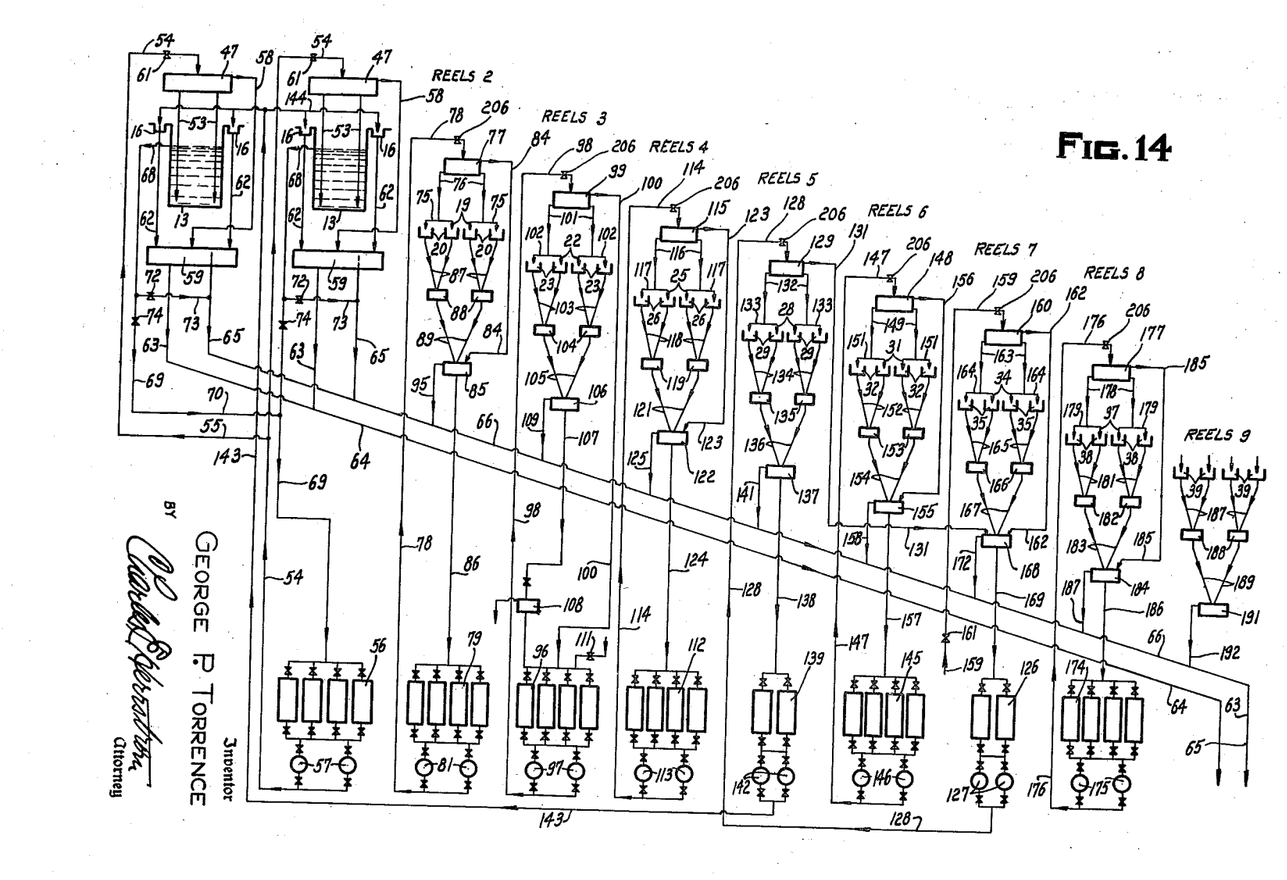
Figure 14 is a diagrammatic representation of the circulation system of the illustrated machine.

The actual installation for the illustrated liquid circulation system embodying the invention is shown in Figures 1 to 13, inclusive. Figure 14, however, is a diagrammatic representation of said system for the circulation of the processing liquids which shows the paths of travel of the various liquids. While parts in Figure 14 bear the same reference characters as corresponding parts in the other figures, the parts represented in Figure 14 are not shown as arranged in the actual relationship, but are shown in what might, for lack of a better term, be called a developed representation.

In each machine, the coagulating bath liquid is supplied to trough 13 through openings at intervals in pipes 46 which extend throughout the length of the trough 13 (Figures 1 and 5). Pipes 46 communicate with coagulating liquid supply box 47 located above the upper surface of the coagulating bath in coagulating trough 13 (Figures 2 and 5). The supply box 47 is divided into a central compartment 48 and opposite end compartments 49 by vertical partitions 51 (Figures 2 and 13). A weir notch 52 is formed in each partition 51. Each of the coagulant pipes 46 is connected to one of the end compartments 49 through a vertical pipe 53. The central compartment 48 is supplied with coagulating liquid through a conduit 54.

As shown in Figures 2, 5 and 14, the coagulant conduit 54 for the left hand machine in Figure 5 is connected by a cross-pipe 55 to the coagulant conduit 54 of the right hand machine, which conduit passes through the floor and is supplied with liquid from supply or make-up tanks 56 (Figure 14). One or more pumps 57 may be provided to force the coagulant from tanks 56 up through the pipes 54 to the supply boxes 47. Within the central compartment 48 of each supply box 47 may be located an overflow pipe 58 (Figures 2, 5 and 13), the upper end of which is well above weir notches 52 in partitions 51. Overflow pipe 58 discharges into a trough 59 which extends across the end of each machine.

On each machine, overflow pipe 58 is provided primarily for emergencies, to permit the discharge of the coagulant to the sewer. In ordinary operation, the coagulating liquid is supplied to the box 47 at the desired rate of flow, which can be adjusted by means of the valve 61 in the supply pipe 54. The partitions 51 with weir notches 52 serve to keep the head of liquid on the coagulating trough 13 substantially constant. The depth of fluid flowing in the weir notches 52, an indication of the quantity of liquid flowing into the coagulating tank 13, can be very accurately measured.

Trough 59 also receives the fluid discharged through conduits 62 from the waste troughs 16 on opposite sides of the coagulating trough 13. Trough 59 of each machine of Figure 5 discharges into a conduit 63. As shown in Figures 2 and 5, the conduit 63 for the left hand machine of Figure 5 runs vertically downward through the floor, while the conduit 63 for the right hand machine of Figure 5 communicates with the left hand conduit 63 through inclined conduit 64. Trough 59 of each machine of Figure 5 is, as shown in Figures 2 and 5, also provided with an overflow emergency conduit 65.

The entrance of emergency overflow conduit 65 is above the entrance of conduit 63, which extends vertically alongside this machine. The emergency overflow conduit 65 for the left hand machine runs vertically downward through the floor, lying in back of conduit 65 (Figure 5). The conduit 65 for the right hand machine of Figure 5 is connected by an inclined conduit 66 to the conduit 65 for the left hand machine, such conduits 65 and 66 lying directly in back of conduits 63 and 64 for the right hand machine. The discharges from the combined conduits 63 and from the combined conduits 65 may be emptied into a sewer or, if desired, the reagents contained in them may be recovered.

To maintain a constant depth of fluid in the coagulating trough 13 of each machine, elevated overflow pipes 67 are provided at intervals in the trough along the length thereof, as shown to advantage in Figure 1. These overflow pipes 67 discharge into a common conduit 68 extending lengthwise of the machine beneath trough 13 as shown in Figures 1, 2 and 5. As is apparent from Figures 2 and 5, on each machine conduit 68 is connected to a vertical return pipe 69. The return pipe 69 for the right hand machine in Figure 5 runs vertically downward through the floor to the storage and make-up tanks 56 below the floor. The return pipe 69 for the left hand machine in Figure 5 does not do so but is connected to the return pipe 69 of the right hand machine by cross pipe 70.

On each machine, a by-pass valve 72 may be provided, as shown in Figures 2, 5 and 14, to connect the return pipe 68 to the waste conduit 65 through pipe 73. A valve 74 may, as shown in Figures 2 and 14, also be disposed in each return pipe 69. By opening valve 72 and suitable adjustment of valve 74, part or all of the returned coagulating liquid is returned to the make-up tanks 56. However, at intervals it may be desired to remove a certain amount of coagulating liquid which may be spent and replace it with fresh liquid, in which case valves 72 and 74 are of use. Furthermore, in emergencies or whenever else desired, it is possible to pass all of the liquid to the sewer.

As shown in Figure 14, the coagulating liquid is forced by means of pumps 57 from storage tanks 56 up through conduits 54 to the supply boxes 47, one of which is provided for each machine, from whence it passes to the coagulating trough 13. The coagulating liquid returns to tanks 56 through pipes 69. Any overflow from either box 47, which might arise if something should go wrong, passes out through pipe 58 to waste box 59, from which it passes to the sewer through pipe 63. If desired, part or all of the coagulating liquid leaving either trough 13 may be passed to the sewer through the by-pass valve 72, by suitable adjustment of said valve and of valve 74.

Figure 3:
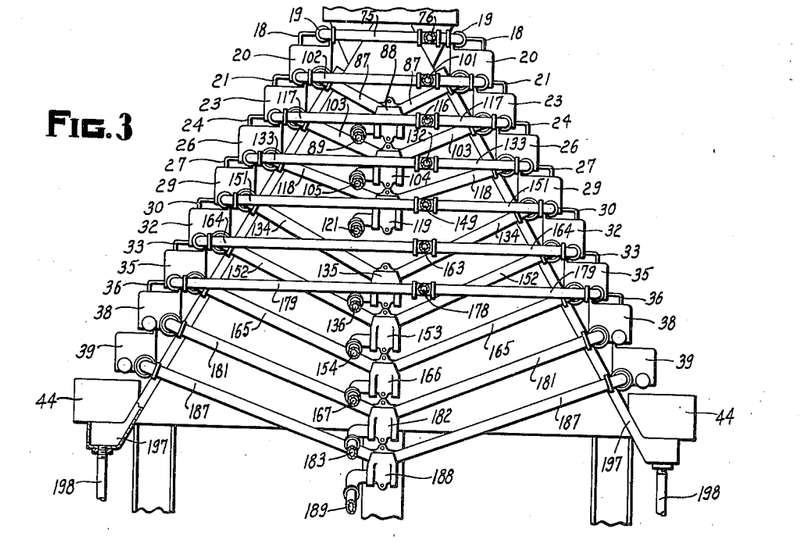
Figure 3 is a sectional elevation on line 3—3 of Figure 5.
Figure 4:
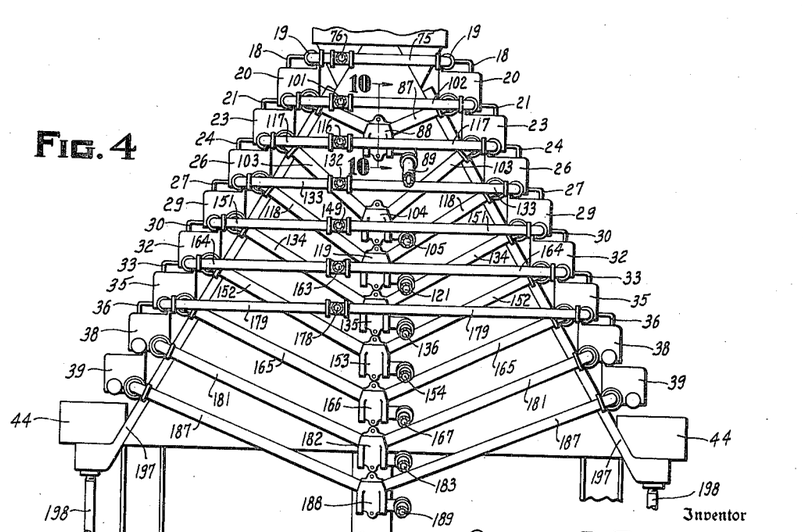
Figure 4 is a sectional elevation on line 4—4 of Figure 5.
Figure 6:
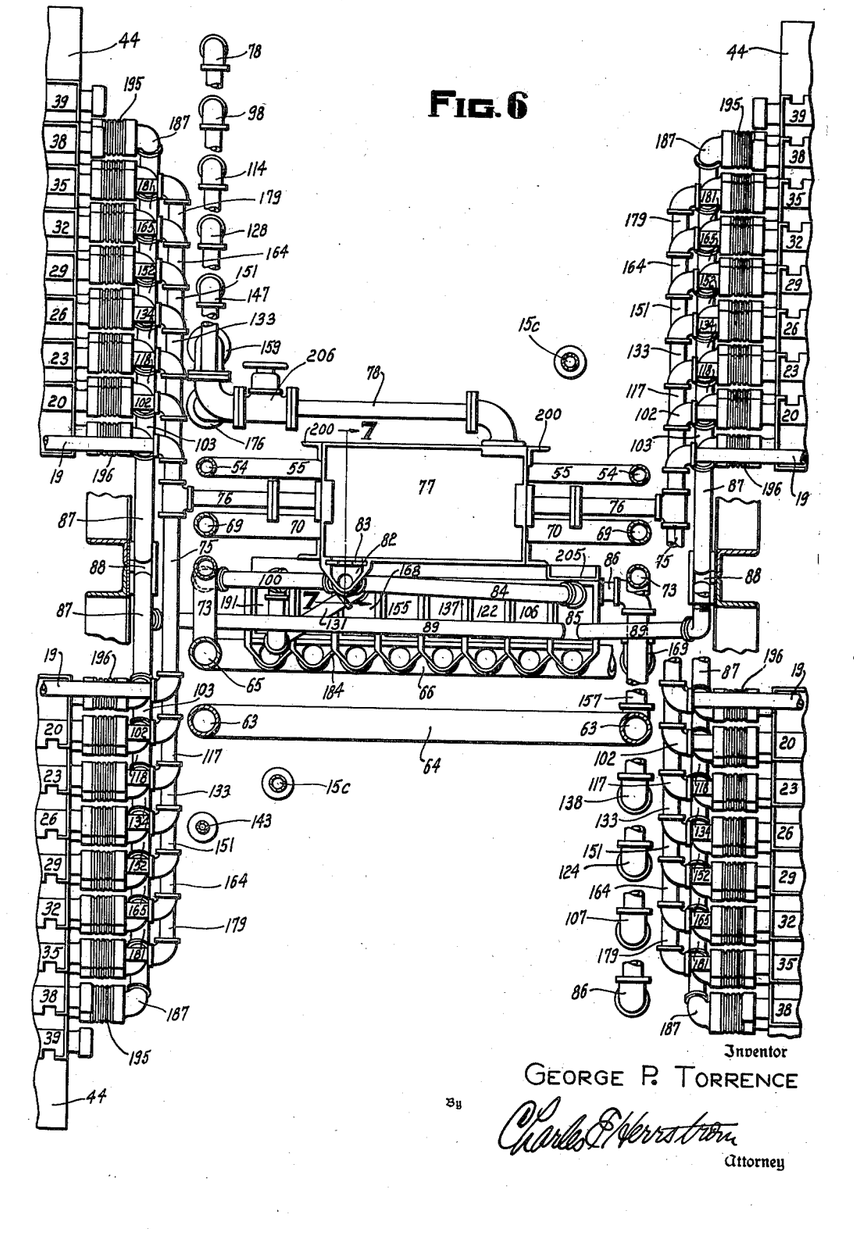
Figure 6 is a sectional plan of the liquid-conveying elements from line 6—6 of Figure 5, parts being broken away for the sake of clearness.
Figure 7:
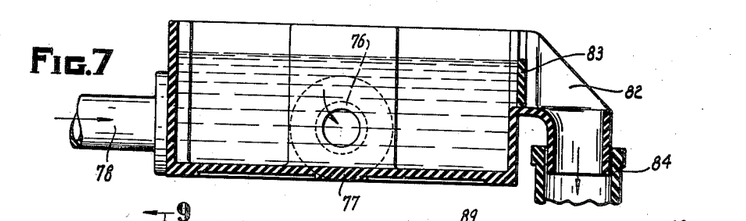
Figure 7 is a sectional elevation through one of the constant head supply boxes along the line 7—7 of Figure 6.

The conduits 19 which supply the desired reagent, which may be a coagulating liquid, to the distributor pipes 18 for the reels 2 on opposite sides of each machine are joined by a transverse conduit 75 as shown in Figures 3, 4 and 6. Each conduit 75 is connected by conduit 76 to one end of a constant head supply box 77. The reagent for reels 2 is supplied to constant head box 77, shown in enlarged scale in Figure 7, through conduit 78 from storage tanks 79 by means of one or more circulating pumps 81 (Figures 2 and 14). One of the sides of box 77 is provided with an overflow portion 82 having a weir plate 83 which may be adjustable to vary the head of liquid in the box.

Liquid somewhat in excess of the amount supplied to the reels 2 is supplied to the box 77, the excess flowing out of the box over the weir plate 83 into return conduit 84, so that a constant head is maintained in the box. By adjusting the height of the top surface of weir plate 83, the head of liquid in the box 77 may be regulated, as by placing a plate having suitable height in the slot adapted to receive the plate. In this manner, the volume of the liquid flowing into conduits 19 on both sides of the two machines may be controlled. The constant head box 77 and particularly the top surface of weir plate 83 are sufficiently above the level of conduits 19 and distributing conduits 18 to provide a sufficient head to supply the processing liquid to all reels 2 on both sides of both machines. Accurate control of the amount of and pressure of liquid supplied to conduits 19 and to the distributor pipes 18 is thus effected. This is extremely desirable, since thus the liquid can be economically used and the processing conditions on the reels 2 accurately adjusted.

For all reels 2 in the series extending lengthwise of the illustrated apparatus, the orifices in the distributor pipes 18 are the same size. Because of the large cross-sectional area of the conduits 18 as compared to that of the distributor orifices, the pressure loss which occurs from the supply end of the longitudinally extending series of reels 2 to the other end of the apparatus is so small as to have a negligible effect on the flow of liquid from the distributors. By such apparatus, therefore, all reels 2 may be supplied with substantially identical quantities of processing liquid at substantially identical rates of flow. Similar factors hold true for all other corresponding reels on which processing liquids are applied to the thread in the illustrated embodiment.

Figure 8:
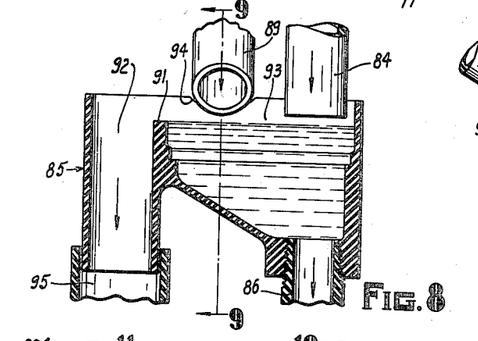
Figure 8 is a sectional elevation through one of the main return boxes on the line 8—8 of Figure 5 or of Figure 9.
Figure 9:
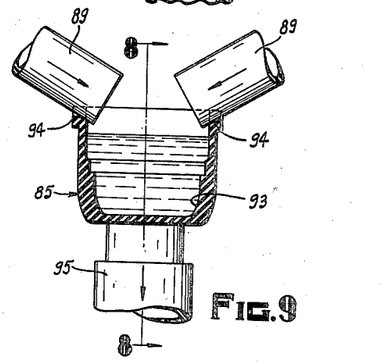
Figure 9 is a sectional elevation through the return box on line 9—9 of Figure 8.
Figure 10:
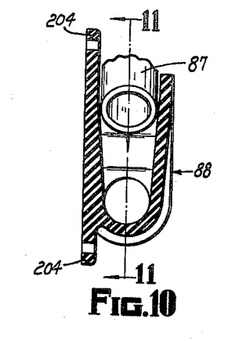
Figure 10 is a sectional elevation through one of the junction boxes corresponding to line 10—10 of either Figure 4 or of Figure 11.
Figure 11:
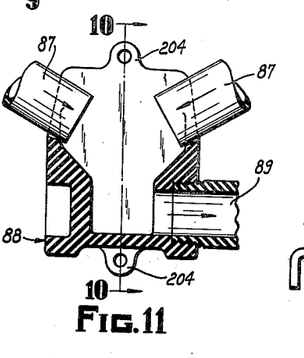
Figure 11 is a sectional elevation through the junction box from line 11—11 of Figure 10.

As shown in Figures 2, 5 and 14, conduit 84 discharges into return box 85. Communicating with the bottom of return box 85, shown on an enlarged scale in Figures 8 and 9, is a return pipe 86 which leads to storage and make-up tanks 79. By means of this arrangement, all of the excess liquid which flows over weir plate 83 of the constant head box 82 may be returned to the tanks 79 for re-use.

As is apparent from Figures 3, 4, 5 and 6, the processing liquid which has been applied to the reels 2 and has been collected in the troughs 20 below said reels on opposite sides of each machine is delivered by pipes 87 to a common junction box 88 fixed to such machine. The box 88 is shown in enlarged scale in Figures 10 and 11. From the bottom of the junction box 88 on each machine a pipe 89 carries the liquid to the return box 85. Thus the treating medium applied to the thread on reels 2 on both sides of the two machines is caused to join the excess liquid leaving the constant head box 77 through pipe 84 for return to the storage tanks 79 through the pipe 86.

In the illustrated embodiment of the invention, as shown in Figures 8 and 9, the return box 85 is formed with an internal partition 91 the top edge of which is somewhat below the upper surface of the box but a substantial distance above the bottom of the box. This partition separates the return box 85 into compartments 92 and 93. The lower ends of conduits 89 lie in notches 94 in opposite side walls of the return box 85 and deliver into compartment 93, as does return pipe 84 from the constant head box 77. Conduit 86 leading to the tanks 79 is connected to compartment 93. Compartment 92 on the opposite side of partition 91 delivers through pipe 95 into inclined emergency discharge pipe 66. Therefore, if for any reason the liquid is supplied to return box 85 at a greater rate than it can be removed therefrom by return conduit 86, as because of clogging of the conduit 86, the liquid overflows partition 91 and passes into the sewer.

The shape of the illustrated return box, which as shown is provided with a concave portion between the discharge portions of the two compartments 93 and 94, is advantageous in that it permits the pipe passing to the next lower return box from the corresponding junction box on the right hand machine in the illustrated embodiment to pass through said concave portion without interference of the upper return box. This is evident from consideration of Figure 5, but holds true for all return boxes except, of course, the lowermost. All return boxes are preferably made of identical shape.

The flow of the liquid supplied to the reels 2 is apparent from Figure 14. The liquid is supplied from tanks 79, being forced by one or more pumps 81 through conduit 78 to the constant head box 77. A constant head is maintained in said box by a weir, as explained above, the excess liquid passing through pipe 84 to the junction box 85, whence it passes through return pipe 86 to the tanks 79. The liquid in the overflow box which does not pass over the weir passes through pipes 76 to the transverse pipes 75, one for each machine, which connect the conduits 19 extending longitudinally of the machine. The liquid is applied to the thread on the reels 2 and is collected in troughs 20. The collected liquid flows from the troughs 20 on opposite sides of each machine to a junction box 88 on the machine. The discharge from the junction box 88 for two adjacent machines passes through pipes 89 to return box 85, from whence it returns to tanks 79 through pipe 86.

The washing liquid applied to the thread on reels 3 is applied from storage tanks 96 (Figure 14). By means of one or more pumps 97, the liquid is delivered through conduit 98 to constant head supply box 99 which may, as shown, be disposed below and be substantially identical to constant head supply box 77 (Figures 2, 5 and 14). The overflow from this constant head box returns directly to the storage tanks 96 through a conduit 100. From each end of box 99, as shown in Figures 5 and 6, a conduit 101 is connected by means of a transverse conduit 102 (Figures 2, 3, 4, 5, 6 and 14) to the conduits 22 extending longitudinally along opposite sides of each machine.

On each machine, the liquid which is supplied to the reels 3 through distributors 21 from conduits 22 is collected in the corresponding collecting troughs 23. The liquid collected in the troughs on each machine passes through pipes 103 to a junction box 104 located immediately below junction box 88 as shown in Figures 3 and 4. From junction box 104 on each machine the liquid passes through a conduit 105 to a main return box 106.

Return box 106 is similar in construction to main return box 85. In the illustrated embodiment, from the bottom of return box 106 the returning liquid flows through conduit 107 to an overflow weir box 108 (Figure 14). The latter passes the excess part of the liquid to the sewer and returns the remainder to the storage and make-up tanks 96. Return box 106, which is similar to the previously described return box 85, is also provided with a partition over which flows any excess liquid through a pipe 109 into emergency discharge conduit 66.

The differences as between the paths of travel of the liquid applied to the thread on reels 3 and the paths of travel of the liquid applied to the thread on reels 2, shown by Figure 14, are desirable because of the nature of the processing operation performed on the thread while stored on reels 3 in the illustrated example of the invention. The operation is primarily a washing operation to free the thread of the coagulant before it passes to the succeeding alkaline desulphurizing operation. It has been found, however, that if the washing liquid is weakly acidic, beneficial results are obtained because of the fact that the formation of precipitates on the thread, which tend to form because of the use of salts in the coagulating bath, is prevented. Yet, the treating liquid applied to the thread on reels 3 should be only weakly acidic, since an acid concentration greater than a very small amount would result in difficulties in the succeeding alkaline desulphurizing stage.

The sodium sulphide solution for the desulphurizing operation, which solution is applied to the thread stored on reels 4, is contained in storage and make-up tanks 112. By means of pumps 113 this fluid is delivered through conduit 114 to constant head supply box 115. A conduit 116 leads the solution from each end of box 115 to a transverse conduit 117 (Figures 2, 3, 4, 5, 6 and 14) which is connected to the two longitudinal conduits 25 on opposite sides of the corresponding machine.

The liquid applied to the reels 4 on each machine from the conduits 25 through the agency of the distributor pipes 24 is collected in the troughs 26. The liquid from reels 4 collected in the troughs on opposite sides of each machine is conducted through pipes 118 to junction box 119 (Figures 3, 4 and 14). A conduit 121 conveys the liquid from each junction box to a main return box 122 (Figures 5 and 14). Also discharging into return box 122 is conduit 123 leading from the overflow weir of constant head supply box 115. All of the fluid so delivered into return box 122 is returned through conduit 124 to the storage tanks 112, thus completing a closed circuit. Any overflow of the liquid in return box 122 discharges through conduit 125 into emergency discharge conduit 66.

The washing liquid for reels 5 originates in make-up storage tanks 126, which, as will be described later, receive the liquid which has been used to wash the thread on reels 7 after the thread has been subjected to bleaching liquid on reels 6 (Figure 14). One or more pumps 127 deliver the liquid from said tanks through conduit 128 to constant head supply box 129 for the reels 5. The overflow from box 129 passes through conduit 131 and is returned indirectly to the tanks 126, as will hereinafter appear. This return is for the purpose of re-supplying the overflowing washing liquid to the reels 5 before it is contaminated with the desulphurizing solution carried over by the thread from reels 4, inasmuch as the character of the liquid in supply box 129 is the same as that of the washing liquid in tanks 126.

As shown in Figure 5, from each end of supply box 129 the washing liquid is conducted through conduit 132 to a transverse conduit 133 (Figures 3 and 4). On each machine, the transverse conduit 133 is connected to conduits 28 which extend longitudinally of the machine on each side thereof and supply the liquid to the reels 5 through the distributor pipes 27.

The washing liquid collected in the collecting troughs 29 beneath reels 5 of each machine is conveyed by inclined conduits 134 to junction box 135 (Figures 3 and 4). From junction box 135 on each machine a conduit 136 carries the collected liquid to main return box 137 common to both machines. The liquid passes from return box 137 through conduit 138 to a separate tank 139, below the floor (Figure 14). Any emergency overflow from return box 137 passes through conduit 141 into the emergency discharge conduit 66.

Since the washing liquid, after use on reels 5, is passed to a tank different from the tank in which the liquid originated, the liquid is not recirculated back through the same processing stage, as was the case in connection with the processing operations previously discussed. This is desirable, among other reasons, because it prevents the cumulative concentration in the washing liquid of the desulphurizing liquid carried by the thread from the preceding processing stage. Such concentration, of course, would be undesirable in washing liquid, the purpose of which is to wash the thread free of such desulphurizing liquid.

In the illustrated embodiment, the washing liquid after use on reels 5 and after being collected in tank 139 is caused to flow by one or more pumps 142 through pipe 143 to the branched pipe 144, one branch of which passes to each machine and through suitable connections delivering the washing liquid to the waste troughs 16 on each side of each machine, as shown in Figures 2, 5 and 14. As has been indicated, the liquid passing through the waste troughs 16 passes through conduits 62 into box 59, from which it discharges to the sewer through conduit 63.

The bleaching solution to which the thread is subjected on reels 6 is contained in make-up and storage tanks 145 (Figure 14). By means of one or more pumps 146 this liquid is delivered through conduit 147 to constant head supply box 148. A conduit 149 at each end of supply box 148 conveys the bleaching liquid to conduit 151 extending transversely of the corresponding machine as shown in Figures 2, 3, 4, 5, 6 and 14. On each machine the transverse conduit 151 supplies the liquid to the conduits 31 which extend longitudinally of the machine on opposite sides thereof and supply liquid to the reels 6 through distributors 30, as is advantageously shown in Figure 1.

The bleaching liquid collecting troughs 32 disposed below the reels 6 on opposite sides of each machine is conveyed through inclined conduits 152 to a junction box 153 fixed to each machine as shown in Figures 3 and 4. The liquid from each junction box 153 is delivered through inclined conduit 154 to a main return box 155. The bleaching liquid which overflows the weir of constant head box 148 passes through conduit 156 to the main return box 155. All of the liquid thus collected in box 155 is delivered through conduit 157 to the supply tanks 145. Thus a circulation system for the bleaching liquid is provided. In case of an emergency overflow of liquid in the main return box 155, the liquid may pass through conduit 158 into the emergency discharge conduit 66.

For reasons which will be apparent hereinafter, the liquid applied to the thread on the next reels 7 is preferably fresh wash water. Water of the desired degree of purity and softness may be supplied from a suitable source, as through conduit 159 to constant head supply box 160. Since the source of water is ordinarily outside the manufacturing plant, no water storage tanks are ordinarily necessary in association with the machines. If desired, the admission of water from conduit 159 into supply box 160 may be controlled by a float within the supply box, but the supply may also be conveniently controlled as shown by a valve 161 in conduit 159, the flow being in excess of that necessary so that some fluid always overflows the weir of the box 160 into pipe 162, thus keeping a constant head on the distributors supplying liquid to the reels.

The wash water is conducted to each machine from supply box 160 through a conduit 163 which communicates with a transverse conduit 164, connecting with longitudinal reel supply conduits 34 on opposite sides of each machine as shown in Figures 2, 3, 4, 5, 6, and 14.

From the collecting troughs 35 disposed beneath reels 7 on the opposite sides of each machine, the wash water is conveyed through inclined conduits 165 to junction box 166 fixed to the machine as shown in Figures 3 and 4. A conduit 167 carries the liquid from each junction box 166 to the main return box 168, which communicates with storage tanks 126 through conduit 169. From tanks 126 the liquid passes to the supply box 129, and is used to wash the thread on reels 5, as was previously explained and as is apparent from Figure 14.

In the illustrated apparatus, the liquid which has discharged over the weir in the constant head supply box 129 for reels 5 into conduit 131 and the liquid which has discharged over the weir in constant head supply box 160 for the reels 7 and which passes through conduit 162 are combined and passed to the tanks 126 through return box 168 and conduit 169. In the illustrated embodiment of the invention, the overflow conduit 131 from the supply box 129 and the overflow conduit 162 from the supply box 160 join in the Y coupling 171, as shown in Figure 5. Return box 168 may be provided with an overflow partition and communicate with the emergency discharge conduit through conduit 172, in a manner similar to other return boxes.

The nature of the contamination of the wash water which occurs after the water has been used to wash the thread on reels 7 is such that the water is entirely suitable for washing the thread on reels 5 after the desulphurizing operation on reels 4. This arises out of the fact that both the desulphurizing and bleaching liquids are alkaline, as a result of which is obviated the production of undesirable reaction products if the washing water from reels 7 containing a slight amount of alkaline bleaching liquid is used to wash the thread immediately after the desulphurizing operation, when it contains alkaline desulphurizing liquid. Moreover, the bleaching solution itself is very dilute, so that the liquid leaving the washing stage on reels 7 after the bleaching stage on reels 6 is only slightly contaminated. It is because of these facts that the liquid in conduit 169 after leaving reels 7 is delivered to storage tanks 126 for use in washing the thread stored on reels 5. Because the liquid overflowing the weir of supply box 129 into conduit 131 is of the same character as the liquid in the storage tanks 126, since the liquid was pumped from tanks 126, conduit 131 is connected to return such liquid to storage tanks 126. The overflow from supply box 160 into conduit 162 serves to further dilute the originally very weak concentration of bleaching liquid in the wash water contained in tank 126 because such overflow liquid is fresh water.

The finishing liquid which is applied to the thread stored on reels 8 is contained in storage and make-up tanks 174. By means of one or more pumps 175 this liquid is delivered through conduit 176 to constant head supply box 177. For each machine, a conduit 178 leads from supply box 177 to a transverse conduit 179, which connects with the longitudinal conduits 37 on opposite sides of the machine as is shown to advantage in Figures 2, 3, 4, 5, 6 and 14. The liquid collected in the troughs 38 on opposite sides of each machine drains through conduits 181 to junction box 182.

A conduit 183 carries the liquid from each junction box 182 to a common main return box 184. The liquid overflowing from over the weir of constant head supply box 177 is conducted through conduit 185 to the main return box 184. The liquid so collected in box 184 returns through conduit 186 to the storage tanks 174 thus completing the cycle. As in the case of previously described return boxes, return box 184 provides emergency overflow through conduit 187 to emergency discharge conduit 66.

As has been pointed out, in the illustrated embodiment of the invention, each reel 9 serves as a drip reel. For this reason no liquid is supplied to longitudinal conduits 40. The liquid which is carried by the thread from reels 8 to reels 9 and which drips from the thread while stored on reels 9 is collected in troughs 39. Troughs 39 on opposite sides of each machine are connected through conduits 187 to junction box 188 as shown in Figures 3 and 4.

From each junction box 188 a conduit 189 leads to a return box 191 (Figure 5). In the machine illustrated, the liquid collected in return box 191 is discarded to waste by connecting its outlet with the emergency discharge conduit 66. One suitable manner of causing the finishing liquid collected in return box 191 to pass into the emergency sewer pipe without substantially changing the construction of any part is to stop the outlet in the return box corresponding to the outlet from compartment 93 of the return box illustrated in Figures 8 and 9, so that the liquid will overflow the partition in the return box 191 and discharge through conduit 192 into the emergency discharge conduit 66. Of course, the finishing liquid in return box 191 may be conducted to storage tanks 174 for re-use, if desired.

Thereafter, each thread passes from its reel 9 to the corresponding drying reel 10, after which it is collected on the corresponding cap twister 45.

Thus it can be seen that the apparatus illustrated as embodying the invention makes possible the re-use and recirculation of such liquids as may advantageously be re-used. In this way it provides great economy of consumption of processing liquids and thus eliminates the tendency, common in other continuous processing systems, to consume excessive amounts of processing liquids. Moreover, it provides for the repeated use of washing water at several different stages of the manufacturing process. To summarize briefly, in the illustrated embodiment fresh water is applied to the thread on reels 7 to wash the thread free of the bleaching liquid applied to the thread on reels 6. This is desirable because the bleaching operation is the last liquid treatment which considerably modifies the characteristics of the thread, before the final liquid finishing step, which may be oiling or soaping. Therefore, according to the present invention, the thread is washed with the purest water used in the machine after the bleaching operation.

Water collected after such use, being slightly alkaline from the bleaching liquid washed from the thread, is employed to wash the thread stored on reels 5 free of the alkaline desulphurizing liquid applied to the thread on reels 4. Thus the water is used to wash the thread twice, each time after an alkaline processing liquid has been applied to the thread. In other words, the hydrogen ion concentrations of the treating liquids applied to the thread before said washing operations lie in ranges which are compatible; so that no undesirable reactions, which could, for instance, cause the formation of salts on the thread, can result. The washing water which has been used twice for different washing operations is then used in the waste troughs alongside the coagulating troughs of the two machines before being passed to the sewer.

Under suitable circumstances, the re-used water may also be employed to wash the thread after the acid treatment.

Thus a very economical use is made possible of the washing water, which ordinarily is expensive because of the degree of purity and softness which is required in the manufacture of artificial silk thread. Indeed, actual experiments have shown that when this feature is not employed and fresh wash water is applied on each of the washing stages, from two to three times as much water must be used to produce a given quantity of thread as is required when the water is recirculated as indicated.

In the illustrated embodiment of the invention an upper platform 193 is carried by both machines so that an operator standing thereon can have access to the spinnerets 12, mass tubes 14, spinning pumps, coagulating trough 13, reels 1 and the like. A lower platform 194 is provided along each side of each machine to permit an operator standing thereon to have access to the reels 2 to 9, inclusive, on which wet thread is stored. An operator standing on the floor below the platform 194 can handle the thread on the drying reels 10 and tend the cap twisting apparatus 45.

Each of the illustrated machines may be constructed in sections. For instance, if the machine comprises 50 series of reels on each side for the production of a like number of threads, it has been found desirable to subdivide the processing equipment into sections say of 10 reels each. The various collecting troughs disposed below the reels can be long enough to extend under the corresponding reels in one section. Between sections the corresponding collecting troughs may be connected by suitable couplings, such as those shown in Figures 5 and 6 of the illustrated apparatus, for supplying and removing liquid from the collecting troughs.

In the illustrated apparatus, flexible couplings 195 are provided for connecting the collecting troughs to the drain pipes, and may be provided for conducting the collected liquid from the collecting trough for one section to the corresponding trough for the adjacent section. Such couplings may be made of rubber, if desired, and be slipped over suitable boss portions on the troughs and clamped thereon. Similar couplings 196 may be provided as shown to connect the conduits formed in the troughs with the liquid supply pipes and may also be provided to connect the corresponding conduits in adjacent troughs. In the apparatus shown, an inclined channeled member 197 is also disposed on the frame of the machine below each row of couplings. Said channelled member communicates with the sewer through conduit 198 and serves to collect any liquid which might leak from the couplings or be discharged from the troughs if, for instance, a trough is replaced for any reason.

The liquid thrown off the reels on each side of the machine during rotation thereof tends to cause a current in the liquid collected in the troughs below the reels. If, as in the illustrated apparatus, the reels on both sides of each machine rotate in the same direction with respect to a person facing the free ends of the reels, this current is directed toward one end of the machine on one side of the machine while it is directed toward the other end of the machine on the other side; whereas the collected liquid is withdrawn from the troughs only at one end of the machine. No particular difficulties occur with most of the processing liquids applied on the reels. However, it has been found that the liquids applied to the thread on reels 2, 3 and 4 have a tendency to foam up at the end of the machine remote from the liquid collecting means on the side in which the artificial current induced by the liquid discharged from the reels is directed away from the collecting means. It has therefore been found desirable to connect the far ends of the corresponding troughs on opposite sides of the machine together as by conduits 199 as shown in Figure 1.

In the illustrated apparatus, the constant head supply boxes 77, 99, 115, 129, 148, 160 and 177 are identical in construction and are disposed in stacked relation, the supply box for the first processing liquid applied to the thread being disposed at the top and the others below it in sequence. The boxes are shown as being supported by vertical uprights 200 at the corners of the boxes, which uprights are supported by cross beams 201 carried by vertical beams 202 and 203. The various junction boxes 88, 104, 119, 135, 153, 166, 182 and 188 for each machine may be disposed as shown in Figures 3 and 4 in vertical arrangement. The junction boxes for each machine may be identical, as shown. Each of the boxes may be fastened to the end of its corresponding machine by bolts through lugs 204, which are shown to advantage in Figures 10 and 11.

The main return boxes 85, 106, 122, 137, 155, 168, 184 and 191 are, in the illustrated embodiment, mounted on an inclined beam 205 so that they are in effect in stepped relation. The top of each return box is disposed alongside of and below the top of the preceding box. Each of the return boxes, as has been indicated, has an emergency discharge conduit connected to the inclined conduit 66 which extends between the two machines.

The stepped arrangement of the main return boxes is advantageous for several reasons. The tops of the boxes are all readily accessible to an operator and hence conduits discharging therein can be easily removed. Moreover, the return boxes are readily accessible to an operator desiring to test the composition of the various processing liquids. It is a simple matter for him to withdraw from the corresponding return box a sample of the liquid. If any of the liquid is found to be too weak or too strong, a strengthening addition or a dilution might be supplied to the corresponding make-up storage tank or even, if desired, to the return box itself. It is desirable to check at frequent intervals the composition of the coagulating liquid, the acid applied on reels 2, the washing liquid applied on reels 3, the desulphurizing liquid applied on reels 4, the bleaching solution applied on reels 6, and the emulsion applied on reels 8. Such liquids, with, of course, the exception of the coagulating bath liquid, can be readily checked in the corresponding return box.

As has been explained above, the weir plates in each of the constant head supply boxes may be made adjustable to secure the desired pressure on the reagent distributors with which said constant head supply box is employed. In the illustrated apparatus, provision has also been made for adjusting the amount of processing liquid flowing into each constant head supply box. By means of valve 206 in the conduit supplying liquid to each constant head supply box, the quantity of liquid flowing into the box may be accurately controlled or, if desired, entirely shut off. Any adjustment of the flow of processing liquid into the constant head supply box should preferably result in a flow of liquid sufficient to cause overflowing at the weir associated with the box, so that a constant head of liquid can be maintained in the box.

In order that excessive pressures may not be caused in the pipes carrying the liquid from the delivery pumps to the corresponding constant head supply box, as upon adjustment of one or more of the valves 206, it is preferable that such pumps be of the impositive delivery type, such as centrifugal pumps.

Preferably, a plurality of storage tanks is provided for each of the various liquids necessary in the manufacture of the thread. Likewise, it is preferable to provide a plurality of pumps to circulate such liquid. With a plurality of tanks and pumps it is possible to take one of the tanks or pumps out of commission if necessary, as for repairs, cleaning or the like, without in the meanwhile stopping the machine as a whole. In actual practice it is preferable that only one pump be employed while another pump and at least one tank are idle to serve as a standby unit.

It is apparent from the above that in the apparatus illustrated as embodying the invention each liquid employed in the manufacture of the thread is pumped from the storage tanks to an elevated supply box. In each case the liquid flows from its supply box through the system and to its return storage tank solely by gravity. Thus it is possible to insure correct liquid pressures and flows by means which are simple in operation yet very effective.

In the case of each of the liquids applied to the thread on the reels, the fact that all corresponding reels on both sides of each of the two processing units are supplied from a common constant head supply box makes it possible to supply identical quantities of liquid at identical rates of flow to all such corresponding reels, so that the processing of the thread on all corresponding reels is uniform. This is an extremely important advantage, since in a continuous processing system, such as that to which the present invention relates, the thread can be subjected to each processing liquid for only a short time and variations in the quantity of liquid and rate of supply thereof on different corresponding reels would be reflected as variations in the final characteristics of different threads. According to the present invention, however, a large number of threads of identical thread characteristics may be produced on apparatus of the illustrated type.

It will further be noted that in the illustrated embodiment of the invention provision is made for discharging all liquids directly to the sewer. Therefore, when desired, or in the case of emergency caused by obstruction of a conduit, etc., it is possible readily to pass any or all liquids to the sewer. This is advantageous in continuous processing apparatus because it makes it possible to perform emergency repairs or remove momentary obstructions while the machine is operating, without the necessity of shutting down the whole machine. The coagulating liquid system in the illustrated apparatus is provided with two pipes discharging to the sewer, to obviate any possibility of difficulty arising out of one of them being out of commission. In consequence, nothing will impair the direct discharge to the sewer, if necessary, of the large quantities of coagulating liquid employed.

In the illustrated apparatus, moreover, to minimize any possibility of obstruction of the discharge conduits due to the formation therein of deposits from the liquids passing therethrough, most of the conduits carrying the liquid which has been collected in the troughs below the reels are either vertical or inclined to the vertical. As shown in the drawings of the apparatus, the conduits from the corresponding collecting troughs on opposite sides of the machine to each junction box are inclined, while the conduits from the junction boxes on both machines to the corresponding main return boxes are likewise inclined. Such conduits, it will be noted, are threaded into fittings at only one end, so they may readily be removed for cleaning or replacement, this without stopping the apparatus. The waste discharge pipes are also either vertical or steeply inclined. The slope of such conduits is such as to inhibit the formation of deposits in the conduits by causing a rapid flow of liquid therethrough.

The conduits and other parts carrying or otherwise exposed to the processing liquids may be formed of materials resistant to the action of the reagents employed.

For instance, they may be made of hard rubber, of Bakelite or other synthetic resins, or of lead or other reagent resistant materials. Very satisfactory results have been obtained when all of the parts coming into contact with the liquids are made of Bakelite, hard rubber or the like, with the exception of the waste discharge pipes and coagulating liquid pipes, which may be of lead. Bakelite, hard rubber, or similar materials are desirable materials for such parts because the resistance of such materials to the action of the liquids employed is good and because of the lightness of such materials. Thus the reels, with the exception of the drying reels which are of metal, may be made of such materials, as well as the coagulating troughs, processing liquid supply and discharge pipes, junction and main return boxes, and the constant head supply boxes. In the illustrated embodiment, indeed, the constant head supply boxes, the junction boxes, and the main return boxes are all shown as molded in one piece of hard rubber, Bakelite, or other suitable synthetic resin.

As is apparent from the drawings, the apparatus illustrated as embodying the invention makes possible a compact, efficient arrangement of conduits for the supply and circulation of the numerous processing liquids which it is necessary or desirable to apply to the thread. Because the conduits and other parts of the liquid conveying apparatus are disposed between the two ends of the machines, economies in floor space are provided. The same holds true as to economies in construction, since various parts such as the constant head supply boxes and the return boxes may be used in common for both machines and thus save the cost of duplication.

The above-described embodiment of the invention is illustrative only and various changes may be made therein without departing from the spirit of the present invention. In the appended claims, the term "thread" is intended to include, besides thread per se, materials such as filaments, bundles of filaments from which staple fiber is formed, artificial horsehair, artificial straw, artificial ribbons, and other materials capable of being processed according to the teachings of the present invention. It is intended that the patent shall cover, by suitable expression in the appended claims, whatever features of patentable novelty reside in the invention.

What is claimed is:

1. Apparatus for the continuous processing of thread comprising two oppositely extending banks of thread-storage devices, each bank comprising a plurality of descending series of thread-storage devices, each of which series handles a thread, of which corresponding devices in each bank may be regarded as being disposed in series extending longitudinally of the bank; a longitudinally extending conduit for supplying processing liquid to each longitudinally extending series of thread-storage devices on which processing liquid is to be applied to the thread; a plurality of containers disposed in superposed relation between said banks at one end of said apparatus, each of said containers being connected to a pair of corresponding conduits in said oppositely disposed banks and being provided with overflow means whereby the level of the liquid in said container is maintained at a predetermined height above the conduits to which the container is connected; means for supplying processing liquid to said container; and collecting means disposed beneath each of said longitudinally extending series of thread-storage devices in each bank for collecting the liquid applied to said thread-storage devices, whereby the arrangement at one end of said apparatus of said superposed supply containers, said overflow means, and said connections of said containers to said longitudinally extending conduits not only permits uniform processing of all threads handled on said apparatus but provides a disposition of all of said processing liquid containing and conducting parts in a compact space.

2. Apparatus of the character described in claim 1 which includes means for combining the liquid overflowing from at least one of said containers with the liquid which has been collected in the collecting means below the thread-storage devices which are subjected to the liquid supplied from said container, and means for recirculating such combined liquid back to said container.

3. Apparatus for the continuous processing of thread comprising two processing units disposed in end-to-end relation, each comprising two oppositely disposed banks of thread-storage devices, each bank comprising a plurality of descending series of thread-storage devices, each of which series handles a thread, of which corresponding thread-storage devices in each bank may be regarded as disposed in series extending longitudinally of the bank; a longitudinally extending conduit for supplying processing liquid to each longitudinally extending series of thread-storage devices on which processing liquid is to be applied to the thread; collecting means disposed below each of said longitudinally extending series of thread-storage devices in each bank for collecting the liquid applied to said devices; a plurality of containers disposed in superposed relation between the adjacent ends of the processing units, each of said containers being connected to a set of corresponding longitudinally extending conduits in both processing units; overflow means associated with said container, whereby processing liquid supplied to said container in excess of that which passes to said longitudinally extending conduits flows therefrom and the level of the liquid in the container is maintained at a predetermined height above the longitudinally extending conduits connected to said container; means for supplying processing liquid to said container; and conduits connecting the corresponding collecting means on the opposite sides of each processing unit to common discharge means disposed between the processing units, whereby the arrangement between adjacent ends of said processing units of said superposed supply containers, said overflow means, said connections of said containers to said longitudinally extending conduits, and said connections of corresponding collecting means on opposite sides of both said processing units to a common conduit not only permits uniform processing of all threads handled on said apparatus but provides a disposition of all of said processing liquid containing and conducting parts in a compact space.

4. Apparatus of the character described in claim 3 comprising means for combining the liquid overflowing from said container and the liquid from said discharge means and conducting the combined liquid back to said container.

5. Apparatus for the continuous processing of thread comprising two oppositely extending banks of thread-storage devices, each bank comprising a plurality of descending series of thread-storage devices of which corresponding devices in each bank may be regarded as disposed in series extending longitudinally of the bank; means for supplying processing liquid to each longitudinally extending series of thread-storage devices on which thread is to be subjected to processing liquid; means for collecting the processing liquid applied to each of said longitudinally extending series of thread-storage devices; junction means associated with each pair of corresponding collecting means in said oppositely disposed banks; conduits connecting said collecting means with said junction means, said junction means being disposed in superposed relation between said banks at one end of the structure defined by said banks; return boxes associated with said junction means; conduits connecting each of said junction means with one of said return boxes, said return boxes being disposed in stepped, stacked relation, whereby the top of each of said return boxes is substantially unobstructed by the return box immediately above it.

6. Apparatus for the continuous processing of thread comprising two processing units disposed in end-to-end relation, said units individually comprising two oppositely extending banks of thread-storage devices, each bank including a plurality of descending series of thread-storage devices of which corresponding devices in each bank may be regarded as disposed in series extending longitudinally of the bank; means for supplying processing liquid to each longitudinally extending series of thread-storage devices on which the thread is to be subjected to processing liquid; means for collecting the processing liquid applied to each of said longitudinally extending series of thread-storage devices; junction means associated with each pair of corresponding collecting means in the oppositely disposed banks for each processing unit; conduits connecting said collecting means with said junction means, said junction means for each unit being disposed in superposed relation between the banks of the processing unit with which they are associated at the end of said unit adjacent the other unit; a plurality of common return boxes disposed between said units; and conduits connecting the junction means for corresponding longitudinally extending series of thread-storage devices in said processing units to common return boxes, said return boxes being disposed in stacked, stepped relation, whereby the upper portion of each return box is substantially unobstructed by the return box immediately above it.

7. Apparatus for the continuous processing of thread comprising two processing units disposed in end-to-end relation, each comprising two oppositely extending banks of thread-storage devices, each bank including a plurality of descending series of thread-storage devices, each of which series handles a thread, of which corresponding devices in each bank may be regarded as disposed in series extending longitudinally of the bank; a longitudinally extending conduit for supplying processing liquid to each longitudinally extending series of thread-storage devices on which processing liquid is to be applied to the thread; means for collecting the processing liquid applied to each of said longitudinally extending series of thread-storage devices; a plurality of containers, each being connected to the corresponding longitudinally extending conduits in the oppositely disposed banks of both of said processing units, said containers being disposed in superposed relation between the adjacent ends of said processing units; overflow means associated with each of said containers whereby processing liquid supplied to said container in excess of that which passes to said longitudinally extending conduits flows therefrom; means for supplying processing liquid to each of said containers; junction means associated with each pair of corresponding collecting means in the oppositely disposed banks for each processing unit; conduits connecting said collecting means with said junction means, said junction means for each unit being disposed in superposed relation between the banks of the processing unit with they are associated at the end of said unit adjacent the other unit; a plurality of common return boxes disposed between said units; and conduits connecting the junction means for corresponding longitudinally extending series of thread-storage devices in said processing units to common return boxes, said return boxes being disposed in stacked, stepped relation, whereby the upper portion of each return box is substantially unobstructed by the return box immediately above it, and whereby the arrangement between adjacent ends of said processing units of said superposed supply containers, said overflow means, said connections of said containers to said longitudinally extending conduits, and said stacked, stepped return boxes and said connections thereto from corresponding collecting means on opposite sides of both said processing units not only permits uniform processing of all threads handled on said apparatus but provides a disposition of all of said processing liquid containing and conducting parts in a compact space.

8. Apparatus for continuously processing thread comprising a longitudinally extending series of thread-advancing, thread-storage devices disposed along each side of the apparatus, each of said thread-storage devices being adapted to store thread thereon and advance it lengthwise thereof in a large number of generally helical turns; means for supplying processing liquid to the thread stored on said thread-storage devices; a longitudinally extending trough containing processing liquid disposed beneath the longitudinally extending series of thread-storage devices on each side of the apparatus, means being associated with said troughs to drain both troughs at the corresponding ends thereof; and conduits connecting the other ends of said troughs together.

9. Apparatus for continuously processing thread comprising a longitudinally extending series of thread-advancing, thread-storage devices disposed along each side of the apparatus, each of said thread-storage devices being adapted to store thread thereon and advance it lengthwise thereof in a large number of generally helical turns; means for rotating the thread-storage devices on opposite sides of said apparatus in opposite directions relative to each other; means for applying processing liquid to the thread stored on said thread-storage devices; a longitudinally extending trough adapted to collect the processing liquid applied to the thread-storage devices disposed beneath the longitudinally extending series of thread-storage devices on each side of the apparatus, means being associated with said troughs to drain both troughs at the corresponding ends thereof; and conduits connecting the other ends of said troughs together.

10. Apparatus for the continuous processing of thread comprising two oppositely extending banks of thread storage devices disposed on opposite sides of said apparatus, each bank comprising a plurality of descending series of thread storage devices, each of which series handles a thread, of which corresponding devices in each bank may be regarded as being disposed in series extending longitudinally of the bank; a longitudinally extending conduit for supplying processing liquid to each longitudinally extending series of thread storage devices on which processing liquid is to be applied to the thread; a plurality of containers disposed in superposed relation between said banks at one end of said apparatus, each of said containers being connected to a pair of corresponding longitudinally extending conduits in said oppositely disposed banks and being provided with overflow means whereby the level of the liquid in said container is maintained at a predetermined height above the conduits to which said container is connected; means for supplying processing liquid to said containers; collecting means disposed beneath each of said longitudinally extending series of thread storage devices in each bank for collecting the processing liquid applied to said thread storage devices; a plurality of return boxes disposed between said banks at the same end of said apparatus as said superposed containers; and conduits connecting corresponding collecting means in said banks on opposite sides of said apparatus to each of said return boxes, said return boxes being disposed, in a series positioned lower than and to one side of said superposed containers, in stacked, stepped relation, whereby the upper portion of each return box is substantially unobstructed by the return box immediately above it, and whereby the arrangement at one end of said apparatus of said superposed supply containers, said overflow means, said connections from said supply containers to said longitudinally extending conduits, and said stacked, stepped return boxes and said connections thereto from said connecting means not only permits uniform processing of all threads handled on said apparatus but provides a disposition of all of said processing liquid containing and conducting parts in a compact space.

11. Apparatus of the character described in claim 7 including means for combining the liquid passing from the overflow means for one of said containers and the liquid passing to the return box corresponding to said container and passing such combined liquid to another of said containers.

GEORGE P. TORRENCE.